United States Patent Office 3,340,295
Patented Sept. 5, 1967

3,340,295
PROCESS OF PRODUCING A MONOESTER OF AN ALKYLENE GLYCOL MOIETY AND A CARBOXYLIC ACID
Edward N. Wheeler and Duane Lee Stearns, Corpus Christi, Tex., assignors to Celanese Corporation, a corporation of Delaware
No Drawing. Filed Dec. 23, 1963, Ser. No. 332,879
9 Claims. (Cl. 260—486)

This invention relates to the preparation of monoesters or carboxylic acids of alkylene and substituted alkylene glycols. This invention also refers to an improved catalyst for the reaction of an alkylene oxide with a carboxylic acid. Another embodiment of this invention is a novel catalyst preparation.

It is well known that glycol esters, particularly acrylates and methacrylates can be prepared by the reaction of the oxide corresponding to the glycol moiety in the ester with the appropriate acid, e.g. acetic, through the use of specific esterification catalysts such as those set forth in U.S. Patent No. 2,929,835. This patent specifically lists trimethylamine, tri-isopropylamine, tri-n-butylamine, N,N-dimethyl cyclohexylamine, N,N-diethylbenzylamine, N-methyl-N-ethyl phenylethylamine, N-methyl-N-ethyl cyclohexylamine, N,N-dimethyl benzylamine, N,N-di-n-butyl phenethylamine, N-methylmorpholine, N-ethylpiperidine, N-methyl pyrrolidine, beta-picoline, sodium hydroxide, potassium hydroxide, calcium hydroxide, calcium oxide, magnesium hydroxide, strontium hydroxide, sodium acrylate, barium methacrylate, magnesium acrylate, sodium methacrylate and calcium acrylate as catalysts for this general reaction. In carrying out this reaction, according to this patent utilizing the catalysts listed in this patent, it is said to be critical to halt the reaction at an acid number beween 2 and 40 in order to prevent the formation of products which, upon subsequent polymerization, cause the formation of thermosetting polymers.

According to the instant invention a novel catalyst has been discovered, the quaternary ammonium anion exchange resins in acid salt form. The novel catalyst of the instant invention is unique in its ability to catalyze this reaction in such a manner that many major advantages are thereby derived. This catalyst is prepared in a novel manner.

It is well known that basic (both strong and weak) anion exchange resins can be prepared or purchased as commercial items. Of particular interest here are the aminated ion exchange resins, i.e. those having pendant amine groups thereon. Examples of the myriad ion exchange resins from which the catalysts of the instant invention can be formed are the products of the reaction of formaldehyde and heterocyclic tertiary nitrogen bases, e.g. N-substituted guanadines, with or without added phenol, and by the copolymerization of chloromethylated styrenes and divinyl benzenes followed by amination with tertiary amines, as well as other techniques. Specific examples of some commercially available basic anion exchange resins include Amberlite IRA–400, 4S and 410 (Rohm and Haas Co.), Dowex 1, 2, 3 and 21K (Dow Chemical Co.) and Permutit S (Pfaudler-Permutit Co.).

In addition to the organic, basic, solid ion exchange resins set forth above; basic, inorganic solid ion exchange resins are applicable to this invention. Further, other strongly basic solid materials, which are not "ion exchange resins" in the usual sense of the term, such as montmorillonite, fullers earth, kaolin, etc., are also quite applicable to the instant invention.

The catalyst for the instant invention is prepared from the solid basic substances exemplified above, or from other similar substances, by forming a carboxylic acid salt of said base. It is preferred that the acid moiety of the salt correspond to the acid being esterified. This preference is from a product distribution point of view; that is, if the acid salt is different than the acid reactant, the ester product will contain a statistical distribution of products dependent upon the proportion of each acid moiety present. Since chemical reactions are usually carried out to produce a single product with as few by-products as possible, it is usually preferred in the instant invention to provide the acid salt and acid reactant as the same acyl moiety. It should be understood, however, that it may in some cases be desired, or even preferred, to produce two, three or more products in some given statistical relationship to each other. This can readily be accomplished by utilizing an appropriate statistical distribution of acyl reactant and/or acyl salt moiety.

The following examples are given by way of illustration of the preparation of acid salt catalysts applicable to the instant invention. The examples are not however, to be construed as limiting of this aspect of the instant invention. Parts and percentages are by weight unless specified to the contrary.

*Example I*

A quaternary ammonium type basic anion exchange resin (Dowex 21K, Dow Chemical Co.), in the chloride form was activated by passing 5 to 10% aqueous caustic solution through the resin. About 10 volumes of caustic were used per volume of resin. The resin, now in the hydroxide form, was washed with water until the effluent was neutral, and then twice washed with acetone. The washed resin was neutralized with acrylic acid in acetone solution (about 1.25 equivalents of acrylic acid per hydroxide equivalent) for 30 minutes. The resin, now in the acrylate form, was washed with acetone and then twice washed with benzene.

The acrylate form resin (1660 parts on an anhydrous basis) was mixed with benzene in a flask and a water-benzene azeotrope was distilled out until substantially all the water was removed. The benzene was drained from the resin and the resin then slurried with acrylic acid. Any remaining benzene was vacuum distilled from the resin. After washing the resin with acrylic acid, it was ready for use.

*Example II*

A quaternary ammonium type anion exchange resin (Dowex 21K, Dow Chemical Co.) in the chloride form was activated in a column bed by passing 7 weight percent aqueous caustic solution through the resin. About 10 volumes of caustic were used per volume of resin. The resin, now in the hydroxide form was washed with five volumes of water per volume of resin to remove the excess caustic. The washed resin was neutralized with acrylic acid as a 3 weight percent aqueous solution and was then washed with acrylic acid (glacial) to remove water. The resin was then ready for use.

It has been found that by use of the catalysts of the instant invention rather than the catalysts of the prior art, the reaction of an alkylene oxide with a carboxylic acid has been greatly improved and that major advantages are thereby derived.

In the first place, it has been found that through the use of an anion exchange resin acid salt catalyst for this reaction, it is not necessary or even desirable to distill the final monoester product since the catalyst can readily be removed by such simple physical methods as filtration. By not having to distill the monoester product, high temperatures usually necessary for distillation are avoided and since these high temperatures can result in further reaction of the product, e.g. through the pendant hydroxyl or polymerization of any unsaturation in the acyl moiety, the elimination of distillation is greatly to be desired. In the second place, it has been found that by carrying out the instant process using the catalysts described herein, it is not necessary to halt the reaction at an acid number of 2 to 40 in order to prevent diester formation, but rather that great latitude is permitted to the process or in carrying the reaction to a greater state of completion, e.g. to an acid number of 1 or even lower, without the product being subject to the deficiencies attributed by the prior art.

The reactants which are generally applicable to the instant invention include substantially any alkylene oxides preferably lower alkylene oxides, for example, ethylene oxide, 1,2-propylene oxide, 1,3 - propylene oxide, 1,2-butylene oxide, 2,3-butylene oxide, other butylene oxide isomers, the various isomers of pentylene oxide and hexylene oxide as well as the higher homologues of these compounds. The oxide reactant in the instant process further includes substituted oxides such as epichlorohydrin, styrene oxide, vinyl cyclohexene dioxide, epoxidized oleic acid, epoxidized soya oil, glycidol, epibromohydrin, allyl glycidyl ether, phenyl glycidyl ether, butadiene dioxide, dicyclopentadiene dioxide, cyclohexene oxide, epoxidized allyl ethers of trimethylopropane and pentaerythritol, trimethylolalkane (e.g. propane) and pentaerythritol oxethane, etc. It is preferred in the practice of this inventon that the substituent on the alkylene oxide group is substantially unreactive with either the reactants or the desired reaction products under storage or reaction conditions. The acid moieties adapted to use in this invention include substantially any carboxylic acid, for example, unsaturated acids, acrylic, methacrylic, ethacrylic: 10-undecenoic, oleic, linoleic, maleic, crotonic, erucic and homologues thereof; saturated aliphatic acids such as acetic, butyric, hexanoic, stearic, neopheptanoic, chloropropionic, glycolic, adipic, cyclohexane carboxylic and homologues thereof; and aromatic acids such as benzoic, toluic, phthalic, substituted monocyclic aromatic acids, naphthylcarboxylic acids and homologues thereof. As will be appreciated, the reactivity of the carboxyl group is what is important in the instant reaction. The substituents appended to the carboxyl group are relatively immaterial to the operability of the instant invention provided they do not impair the reactivity of the carboxyl group in esterification reaction. It is also to be understood that anhydrides of the applicable acids are within the scope of this invention provided there is also some free acid present.

Although this invention has extremely wide general applicability, it is of particular interest with respect to the production of certain types of esters. Esters which are not readily purifiable by distillation, e.g. high boiling esters such as those of oleic or stearic acid, are ideally made by the process of this invention since the catalyst need not be removed by distillation but can be separated by simple low temperature techniques such as filtration. Esters which are readily polymerizable, e.g. unsaturated esters or those containing reactive groups such as propylene glycol monoadipate, are eminently suited to production according to this invention since, as with the high boiling materials referred to above, distillation and accompanying high temperatures are not required to separate the catalyst.

Further advantage in the production of esters according to this invention is obtained since the by-product formation, e.g. diester of the alkylene oxide, is quite low. As noted above, the reaction can be carried to an extremely low product acid number without encountering the detrimental effects cited by the prior art. Additionally the color of the product of this invention is quite good, substantialy better than can be obtained in the raw (unpurified) product of prior art methods. As is well known, color-body impurities should be removed in order to have a salable product, particularly where the product is a monomer which will be subject to subsequent polymerization.

As noted above, the catalyst for the instant reaction, according to this invention, is suitably a strongly basic anion exchange resin, e.g. a quaternary ammonium anion exchange resin in the form of an acid salt. It is preferred, although not essential, that the acid salt correspond to the acid being esterified.

It is preferred in the practice of this invention to carry out the esterifications, where at least one of the reactants contains polymerizable olefin unsaturation, described herein in the presence of an inhibitor for olefinic polymerization. These inhibitors are generally well known in the art and include hydroquinone, p-methoxyphenol, phenothiazine, 1,1'-bi-2-naphthol, pyrogallol, 2,6-dimethoxyphenol, p-ehtoxyphenol and 1,4-naphthalenediol.

The process of this invention suitably includes mixing the alkylene oxide and the carboxylic acid with the polymerization inhibitor. The mixture is brought into contact with the anion exchange resin catalyst for a time sufficient to esterify the oxide and the acid to the monoester form. The reaction product is suitably flashed to remove excess unreacted material and the flashed product may, if desired, be decolorized and filtered if necessary. This process is suitably carried out at a temperature of 25° C. to 150° C., preferably 70 to 100° C. at a pressure of atmospheric to 250 p.s.i.a., preferably 30 to 60. The residence time of the instant reaction is conveniently about 0.1 to 3 hours. It is preferred in the process of this invention to operate continuously, however, it is well within the scope of the instant invention to prepare alkylene glycol monoesters in batch operations. The reactants are suitably introduced in a mole ratio of about 1:1 to 10:1 alkylene oxide to carboxylic acid, preferably 1.05:1 to 1.6:1. It is preferred in the practice of this invention, when operating continuously, to split the reaction product stream with part being flashed and purified as above set forth and part being recycled into admixture with fresh alkylene oxide and carboxylic acid. It has been found by the practice of this invention that undistilled reaction product has been prepared which contain as little as .01% unreacted carboxylic acid, which corresponds to an acid number, where the esterifying acid is acrylic acid, or about 0.08.

Another aspect of the instant invention is carrying out the instant esterification reaction in the presence of a great excess of reaction product (ester). It has been found that by carrying out the reaction in this preferred manner, it is possible to carry the reaction further toward completion (i.e. to a lower product acid number) without forming appreciable quantities of diesters of the alkylene oxide reactant. This is completely unexpected since it would reasonably be supposed that long residence times (e.g. by recycle or retention of the monoester product in the reactor) would tend to encourage diester formation since the monoester product has a pendant hydroxyl group which should be available for reaction with the fresh carboxylic acid being fed. It is also surprising that where the monoester is a polymerizable monomer, e.g. propylene glycol monoacrylate, that this increased residence time does not appreciably increase the amount of polymer formed during the reaction.

One particular feed stream to a reactor operating continuously, including fresh feed and recycle contains about 1.5 weight percent acrylic acid, 10 weight percent propylene oxide and 88 weight percent propylene glycol monoacrylate. Excellent ultimate product yields of monoester having low acid number and good color have been produced from such a continuous reaction process.

The following specific examples are given to further illustrate the instant process aspect of this invention and should not be construed in any way as limiting thereon. All proportions are in parts by weight or weight percent unless specified to the contrary.

*Example III*

Acrylic acid containing 200 parts per million of p-methoxyphenol polymerization inhibitor was sparged with air and fed to a down-flow reactor containing a Dowex 21K anion exchange resin in the ammonium arcylate form. 1,2-propylene oxide was simultaneously fed to the reactor in such proportion as to provide a mole ratio of propylene oxide to acrylic acid of 1.4 moles of propylene oxide per mole of acrylic acid. Also incorporated in the feed stream to this reactor was recycled reactor product in a ratio of about 8 parts recycle per part of fresh feed. The reactor product stream was split, part being recycled as a solvent through a heat-exchanger into admixture with fresh reactant feed as stated above and part being fed to a falling film vacuum flasher. Atmospheric steam was fed to the jacket of the flasher and propylene oxide was removed overhead. The reactor operated at about 90° C. at a pressure of 28 p.s.i.g. The total residence time in the reactor was 1.5 hours. The flasher operated at a pressure of 20 mm. HgA. The desired propylene glycol monoacrylate product having an acid number of 0.64 mg. KOH per gram of sample was filtered to provide a salable product.

The yield of 1,2-propylene glycol monoacrylate was substantially quantitative with a product purity in excess of 97 weight percent by both unsaturation and saponification analytical methods. The product so produced was polymerized and found to give a thermoplastic resin containing substantially no crosslinked gel.

*Example IV*

Acrylic acid containing 400 parts per million p-methoxyphenol polymerization inhibitor was fed simultaneously with propylene oxide to a reactor containing Dowex 21K anion exchange resin in the ammonium acrylate form. The ratio of reactants, which were saturated with oxygen prior to the reaction step, was 1.4 moles of propylene oxide per mole of acrylic acid. Also incorporated in the feed stream to the up-flow reactor was recycled reactor product in a ratio of about 50 parts recycle per part of fresh feed and air in a ratio of about 2,000–3,000 parts recycle per part of air. The reactor product stream which had an acidity of 0.4 weight percent acrylic acid was split, part being recycled as a solvent through a heat exchanger into admixture with fresh feed and air as stated above and part being fed to a vacuum flasher where the unreacted propylene oxide was removed. The filtered product, which had an acid number of 3 mg. KOH per gram of sample, represented a 99 mole percent yield and contained in excess of 97 weight percent 1,2-propylene glycol monoacrylate by unsaturation and saponification analyses (based on acrylic acid). The reactor was operated at about 90° C. at a pressure of 32 p.s.i.g. The residence time in the reactor was 1.5 hours. The flasher was operated at a pressure of 15 mm. HgA.

*Example V*

Similar to Example IV except that the acrylic acid feedstock contained 100 parts per million p-methoxyphenol polymerization inhibitor.

*Example VI*

Acrylic acid (55 moles) containing 400 parts per million of p-methoxyphenol polymerization inhibitor was charged to a batch reactor containing 1750 g. (dry basis) of Dowex 21K anion exchange resin as the acrylate salt. The batch reactor was equipped with a stirrer, heat exchanger, feed inlet and reflux condenser. Heat was applied to the system and ethylene oxide was added simultaneously until sufficient ethylene oxide was in the system so that the reaction mixture refluxed at 65° C. Make-up ethylene oxide was added continuously to the system (to replace that which was consumed by the reaction) in quantities required to maintain the refluxing medium at 65° C. Air was sparged through the stirred heterogeneous catalyst system at a rate of 0.6 cubic feet per hour. The reactor was operated at atmospheric pressure. After 17 hours had elapsed, the reaction mixture was cooled and filtered from the catalyst. A 99 plus mole percent conversion of acrylic acid was obtained. The filtered product had an acid number of less than 0.1 mg. KOH per gram of sample and contained in excess of 96 weight percent ethylene glycol monoacrylate by unsaturation and saponification analyses.

*Example VII*

A mixture of 1.4 moles of propylene oxide and 1.0 mole of acrylic acid (containing 200 parts per million of p-methoxyphenol) was air sparged and fed to the first stage of a two-stage reaction system. Each stage of this system contained Dowex 21K anion exchange resin as the acrylate salt and utilized partially converted reactor product as feed diluent to control the exothermic reaction. Thus, product stream of the first stage reactor, which represented about an 80 mole percent conversion of the acrylic acid, was split into two portions. One portion was mixed with fresh feed in a ratio of 30 parts of product to one part of fresh feed and recycled through a heat exchanger to the first stage reactor. The other portion was fed to the second stage reactor. Product from the second stage reactor, which represented an overall 99.6 mole percent conversion of acrylic acid was likewise split into two portions. One portion was used to dilute feed from the first stage reactor in a ratio of 10 parts of product to one part of feed and the other part was fed to a vacuum flasher where the excess propylene oxide was removed at 20 mm. HgA. The filtered product from the second stage had an average acid number of 3 mg. of KOH per gram of sample. It contained in excess of 97 weight percent propylene glycol monoacrylate by unsaturation and saponification analyses. Residence time for each stage of the two-stage system was 20 minutes. Each stage was operated at a temperature of 90° C. and an overhead pressure of 35 p.s.i.g. The aforementioned reaction system can also be operated as a multistage system either as a semibatch or as a continuous operation.

It is to be understood that the foregoing detailed description is merely given by way of illustration and that many variations may be made therein without departing from the spirit of our invention.

The embodiments of the invention in which an exclusive property or privilege is claimed are defined as follows:

1. In the process of producing a monoester of a lower alkylene glycol moiety and a carboxylic acid, in which process a lower alkylene oxide is reacted with a carboxylic acid, the improvement which comprises catalyzing said reaction with a basic anion exchange resin in the form of a salt of a carboxylic acid.

2. The process claimed in claim 1, wherein said salt is a quaternary ammonium salt of the carboxylic acid being reacted.

3. The process claimed in claim 1, wherein there is a mole excess of said alkylene oxide over said carboxylic acid.

4. The process claimed in claim 1, wherein said reaction is carried out at about 25 to 150° C. under a pressure of about 0 to 235 p.s.i.g. and wherein the residence time in the reactor is about 0.1 to 3 hours.

5. The process claimed in claim 4, wherein the product of said reaction is vacuum flashed to remove unreacted reactants.

6. The process claimed in claim 4, wherein the product of the reaction is split with part being recycled into admixture with fresh reactant feed.

7. The process claimed in claim 6, wherein said alkylene oxide is 1,2-propylene oxide, said acid is acrylic acid and the product is 1,2-propylene glycol monoacrylate.

8. The process claimed in claim 7, wherein said catalyst is a benzyl quaternary ammonium acrylate anion exchange resin.

9. The process claimed in claim 2, wherein said oxide is selected from the group consisting of aliphatic alkylene oxides, aryl substituted alkylene oxides, alkylene dioxides, non-hydrocarbon substituted alkylene oxides and cycloaliphatic alkylene oxides.

References Cited

UNITED STATES PATENTS

| | | | |
|---|---|---|---|
| 1,976,677 | 11/1934 | Wittwer | 260—496 |
| 2,697,080 | 12/1954 | D'Alelio | 260—2.1 |
| 2,794,785 | 6/1957 | D'Alelio | 260—2.1 |
| 2,819,296 | 1/1958 | Carnes | 260—486 |
| 2,851,469 | 9/1958 | Testard | 260—340.2 X |
| 2,898,309 | 8/1959 | Greer | 260—2.1 |
| 2,898,310 | 8/1959 | Greer | 260—2.1 |
| 2,910,490 | 10/1959 | Malkemus | 260—485 X |
| 2,929,835 | 3/1960 | Hayes | 260—486 |
| 2,946,758 | 7/1960 | Zenftman | 260—2.1 |
| 3,059,024 | 10/1962 | Goldberg | 260—486 |
| 3,215,731 | 11/1965 | Bearden et al. | 260—486 |

OTHER REFERENCES

Rohm and Haas, Ion Exchange With the Amberlite Renins, November 1960, pages 10 and 11.

LORRAINE A. WEINBERGER, *Primary Examiner.*

LEON ZITVER, *Examiner.*

D. P. CLARKE, A. P. HALLUIN, *Assistant Examiners.*